United States Patent
Han et al.

(10) Patent No.: US 7,239,057 B2
(45) Date of Patent: *Jul. 3, 2007

(54) SINGLE PHASE INDUCTION MOTOR

(75) Inventors: Seung-Do Han, Incheon (KR);
Hyoun-Jeong Shin, Incheon (KR);
Jun-Ho Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/735,908

(22) Filed: Dec. 16, 2003

(65) Prior Publication Data

US 2004/0174083 A1    Sep. 9, 2004

(30) Foreign Application Priority Data

Mar. 4, 2003   (KR) ................. 10-2003-0013490
Mar. 12, 2003  (KR) ................. 10-2003-0015520
Mar. 14, 2003  (KR) ................. 10-2003-0016177

(51) Int. Cl.
*H02K 16/02* (2006.01)
*H02K 17/02* (2006.01)
*H02K 21/14* (2006.01)

(52) U.S. Cl. .................. 310/114; 310/156.26
(58) Field of Classification Search .......... 310/211, 310/156.08–156.12, 156.23, 156.26, 156.28, 310/156.29, 166, 156.81, 112, 114
See application file for complete search history.

(56) References Cited

U.S. PATENT DOCUMENTS 4,227,105 A * 10/1980 Kumakura .......... 310/153
4,745,318 A * 5/1988 Ivanics ............... 310/114
5,500,994 A * 3/1996 Itaya ................... 29/598
6,093,984 A * 7/2000 Shiga et al. .......... 310/26
6,269,290 B1 * 7/2001 Egami et al. ........ 701/22
6,703,740 B2 * 3/2004 Klode ................. 310/114
6,894,412 B2 * 5/2005 Han et al. ............ 310/112
2003/0168925 A1 * 9/2003 Bernreuther et al. ... 310/156.23

FOREIGN PATENT DOCUMENTS

| DE | 3609351 | | 9/1987 | |
| DE | 19548117 A1 | * | 12/1995 | ........ 310/261 |
| DE | 19547117 | | 8/1996 | |
| DE | 19821632 | | 11/1999 | |
| EP | 0246410 | | 11/1987 | |
| JP | 53-138005 | * | 12/1978 | ........ 29/598 |
| JP | 56-153957 | | 11/1981 | |
| JP | 58-112449 | * | 7/1983 | ........ 310/156.08 |
| JP | 60134752 | * | 7/1985 | ........ 310/156.08 |

(Continued)

OTHER PUBLICATIONS

English language Abstract of KR 10-2004-0078530.

(Continued)

*Primary Examiner*—Tran Nguyen
(74) *Attorney, Agent, or Firm*—Greenblum & Bernstein, P.L.C.

(57) ABSTRACT

A single phase induction motor comprises: a stator installed at an inner circumferential surface of a motor body, the stator on which a plurality of coils are wound; a rotor rotatably installed at a center portion of the stator and provided with a rotation shaft at a center thereof; and a magnet unit freely and rotatably installed between the stator and the rotor with an air gap.

22 Claims, 12 Drawing Sheets

FOREIGN PATENT DOCUMENTS

| | | | |
|---|---|---|---|
| JP | 63-23545 | 1/1988 | |
| JP | 01-501913 | 6/1989 | |
| JP | 3-82350 | * 4/1991 | ............ 310/156.08 |
| JP | 4-322150 | 11/1992 | |
| JP | 4-325860 | 11/1992 | |
| JP | 11-18361 | 1/1999 | |
| KR | 10-20040078530 | 9/2004 | |

OTHER PUBLICATIONS

English language Abstract of JP 4-322150.
English language Abstract of JP 4-325860.
English language Abstract of JP 63-23545.
English language Abstract of JP 56-153957.
English language Abstract of JP 11-18361.
English language Abstract of JP 01-501913.

* cited by examiner

SINGLE PHASE INDUCTION MOTOR

BACKGROUND OF THE INVENTION

1. Field of the Invention

The present invention relates to a motor, and more particularly, to a single phase induction motor capable of reducing a consumption electric power and reducing noise by installing a magnet unit in a body of an induction motor.

2. Description of the Related Art

Generally, an induction motor is an alternating current having no commutator, and one of a rotor and a stator is connected to a power and the other is operated by induction.

FIG. 1 is a longitudinal section view showing an inner part of a single phase induction motor in accordance with the conventional art, and FIG. 2 is a sectional view taken along line A-A' of FIG. 1.

Referring to FIGS. 1 and 2, the conventional single phase induction motor comprises: a motor body 1 serving as a casing; a stator 2 arranged along an inner circumferential surface of the body 1; an AC squirrel cage rotor 3 rotatably arranged at a center portion of the stator 2; and a rotation shaft 4 around which the rotor 3 is rotated. Herein, the rotor 3 is constructed to always maintain a constant interval with the stator 2.

Between the rotation shaft 4 and the motor body 1, a rotation shaft bearing 4a is installed so that the rotation shaft 4 can not be influenced by the motor body 1.

The stator 2 is formed of a plurality of laminated silicon steel sheets, and is provided with a plurality of coil winding protrusions 5 at an inner circumferential surface thereof. A plurality of slots 6 are formed with a constant interval between the coil winding protrusions 5, and a coil 7 is wound on said each coil winding protrusion 5.

The rotor 3 is also formed of a plurality of laminated silicon steel sheets, and is provided with conductor bar holes 8 in the laminated sheets at a constant interval. Conductor bars 9 formed of Aluminum are inserted into the conductor bar holes 8, and end rings 10 are connected to upper and lower end portions of the conductor bars 9.

Operations of the conventional induction motor will be explained as follows.

If a power is applied to the coil 10, a rotating magnetic field is generated by a current of the coil 10 and an induced current is generated at the conductor bars 9.

By an interaction between the generated rotating magnetic field and the induced current, a rotation torque is generated at the rotor 3 and the rotation torque is outputted through the rotation shaft 4.

However, in the conventional induction motor, both a current for generating the rotating magnetic field and an induced current generated from the rotor are supplied through a coil connected to an external power source. At this time, by a primary copper loss generated from the stator coil and a secondary copper loss generated from the conductor bars of the rotor, loss of current is increased and thereby efficiency of the motor is decreased.

SUMMARY OF THE INVENTION

Therefore, an object of the present invention is to provide a single phase induction motor which can increase an efficiency by reducing loss of current and reduce noise.

To achieve these and other advantages and in accordance with the purpose of the present invention, as embodied and broadly described herein, there is provided an induction motor comprising: a stator installed at an inner circumferential surface of a motor body, the stator on which a plurality of coils are wound; a rotor rotatably installed at a center portion of the stator and provided with a rotation shaft at a center thereof; and a magnet unit freely and rotatably installed between the stator and the rotor with an air gap.

As one embodiment, the magnet unit includes: a ring magnet located between the stator and the rotor; a supporter coupled to an one end of the ring magnet, for supporting the ring magnet; and a bearing press-fit into a center of the supporter in order to be rotatably coupled to an outer circumferential surface of the rotation shaft.

As another embodiment, the magnet unit includes: a back yoke located between the stator and the rotor; a plurality of magnets attached to an outer circumferential surface of the back yoke; a supporter coupled to one end of the back yoke, for supporting the back yoke; and a bearing press-fit into a center of the supporter so as to be rotatably coupled to an outer circumferential surface of the rotation shaft.

As still another embodiment, the magnet unit includes: a molding located between the stator and the rotor; a magnet mounted in the molding; a supporter coupled to one end of the molding so as to support the molding; and a bearing press-fit into a center of the supporter so as to be rotatably coupled to an outer circumferential surface of the rotation shaft.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
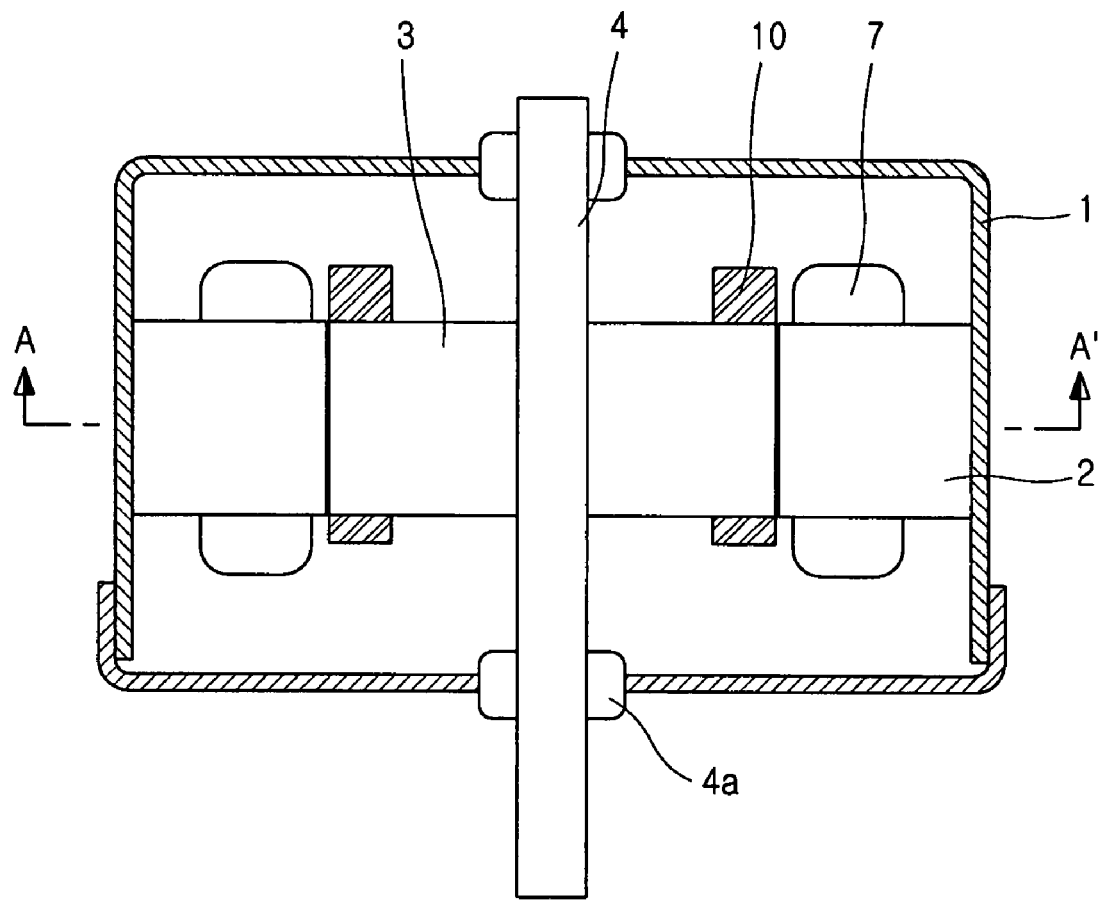
FIG. 1 is a longitudinal section view showing an inner part of a single phase induction motor in accordance with the conventional art.
Figure 2:
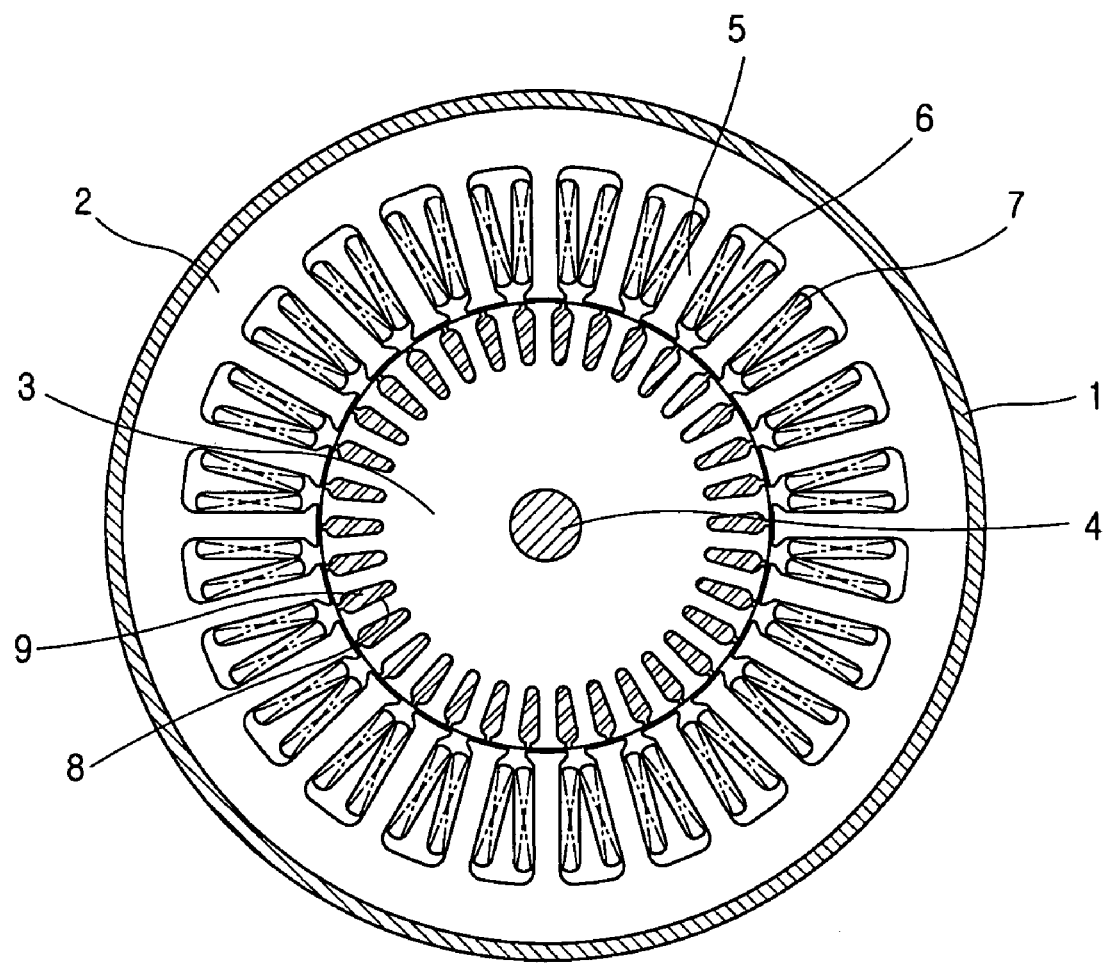
FIG. 2 is a sectional view taken along line A-A' of FIG. 1.
Figure 3:
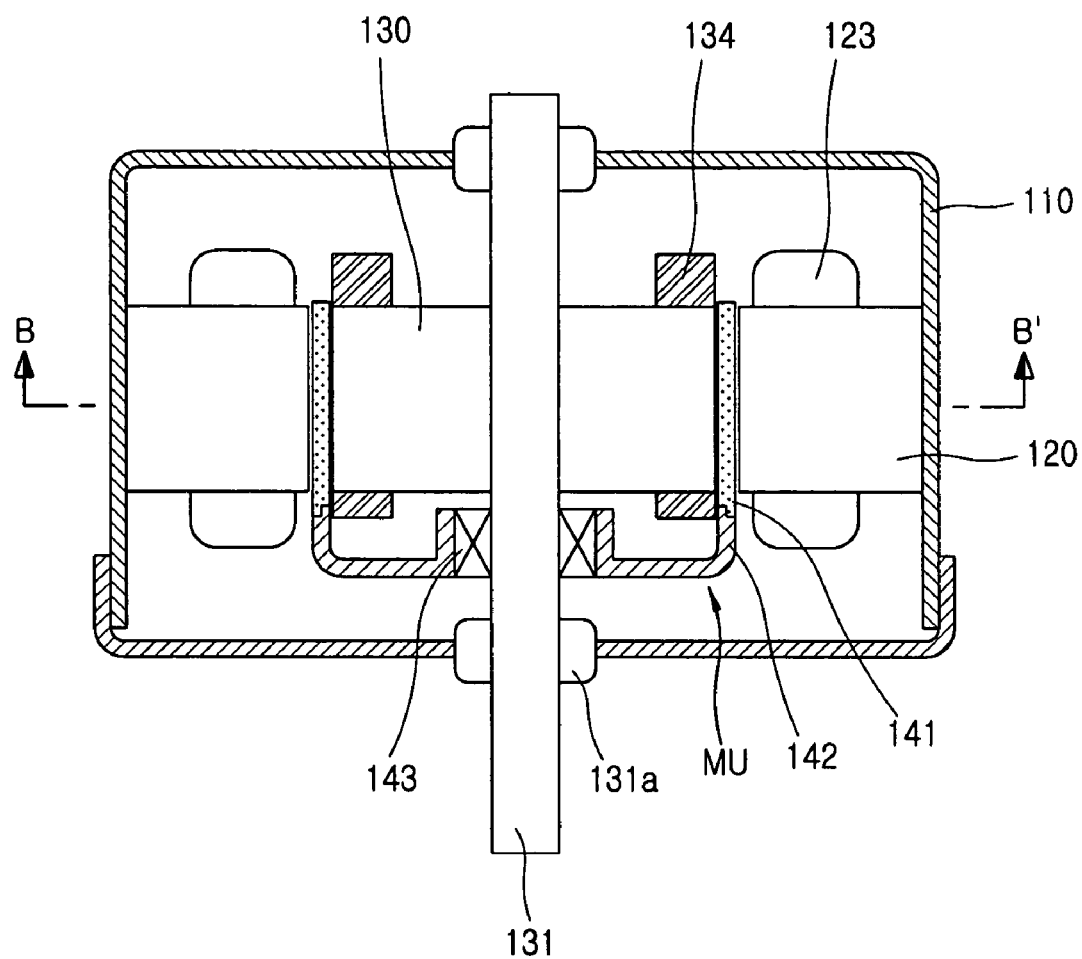
FIG. 3 is a longitudinal section view showing an inner part of a single phase induction motor in accordance with the present invention.
Figure 4:
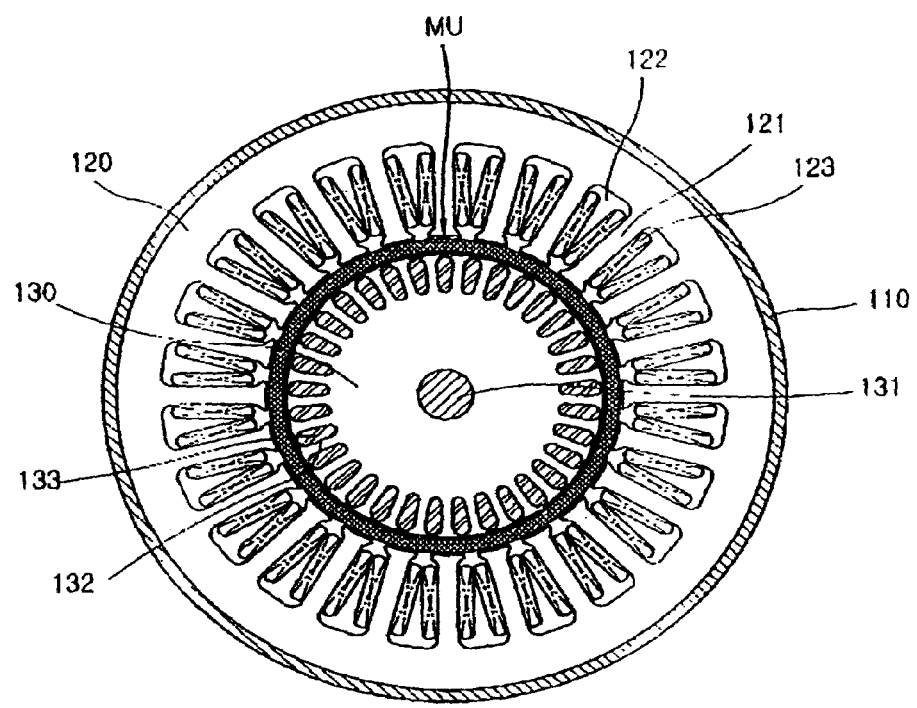
FIG. 4 is a sectional view taken along line B-B' of FIG. 3.
Figure 5:
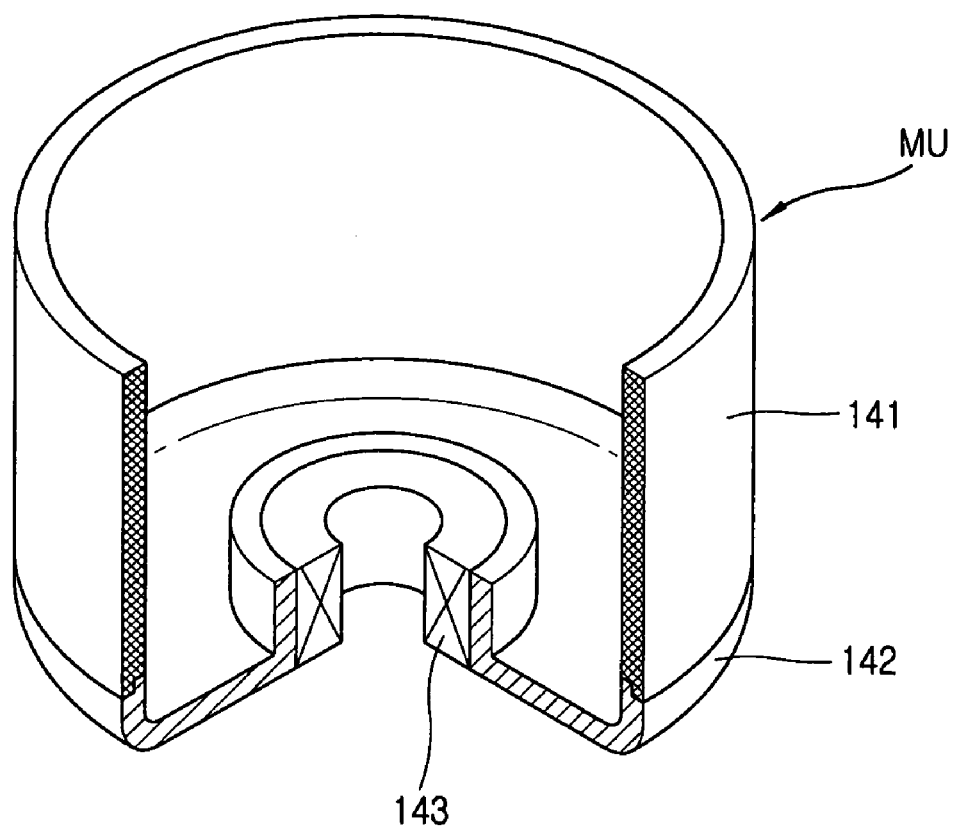
FIG. 5 is a partially-cut perspective view showing a magnet unit of the single phase induction motor according to the present invention.

FIG. 3 is a longitudinal section view showing an inner part of a single phase induction motor in accordance with the present invention, FIG. 4 is a sectional view taken along line B-B' of FIG. 3, and FIG. 5 is a partially-cut perspective view showing a magnet unit of a single phase induction motor according to the present invention.

Referring to FIGS. 3 to 5, the single phase induction motor according to the present invention comprises: a motor body 110 serving as a casing; a stator 120 arranged at an inner circumferential surface of the body 110; a rotor 130 rotatably arranged at a center portion of the stator 120; and a rotation shaft 131 around which the rotor 130 is rotated. Herein, the rotor 130 is constructed to always maintain a constant interval with the stator 120.

Between the rotation shaft 131 and the motor body 110, a rotation shaft bearing 131a is installed so that the rotation shaft 131 can not be influenced by the motor body 110.

The stator 120 is formed of a plurality of laminated silicon steel sheets, and is provided with a plurality of coil winding protrusions 121 at an inner circumferential surface thereof. A plurality of slots 122 are formed at a constant interval between the coil winding protrusions 121, and a coil 123 is wound on said each coil winding protrusion 121.

The rotor 130 is also formed of a plurality of laminated silicon steel sheets, and is provided with conductor bar holes 132 in the laminated sheets at a constant interval. Conductor bars 133 formed of Aluminum are inserted into the conductor bar holes 132 by a die casting method, and end rings 134 are connected to upper and lower end portions of the conductor bars 133.

A magnet unit is freely and rotatably installed between the stator 120 and the rotor 130 by a rotating magnetic field.

Hereinafter, one embodiment of the magnet unit will be explained.

A ring magnet 141 of a cylindrical shape is arranged between the stator 120 and the rotor 130, and a supporter 142 is coupled to one end of the ring magnet 141 so as to support the ring magnet 141. Also, a bearing 143 is press-fit into a center of the supporter 142 so as to be rotatably coupled to an outer circumferential surface of the rotation shaft 131.

The supporter 142 is a non-magnetic substance of a cup shape and can be integrally injection-molded at one side of the ring magnet 141. Also, the supporter 142, although not shown, can be integrally injection-molded at both sides of the ring magnet 141. The supporter 142 can be formed of the same material as the ring magnet 141.

The bearing 143 is preferably a ball bearing type or an oilless bearing type.

Hereinafter, another embodiment of the magnet unit will be explained with reference to FIGS. 6 to 8.

Figure 6:
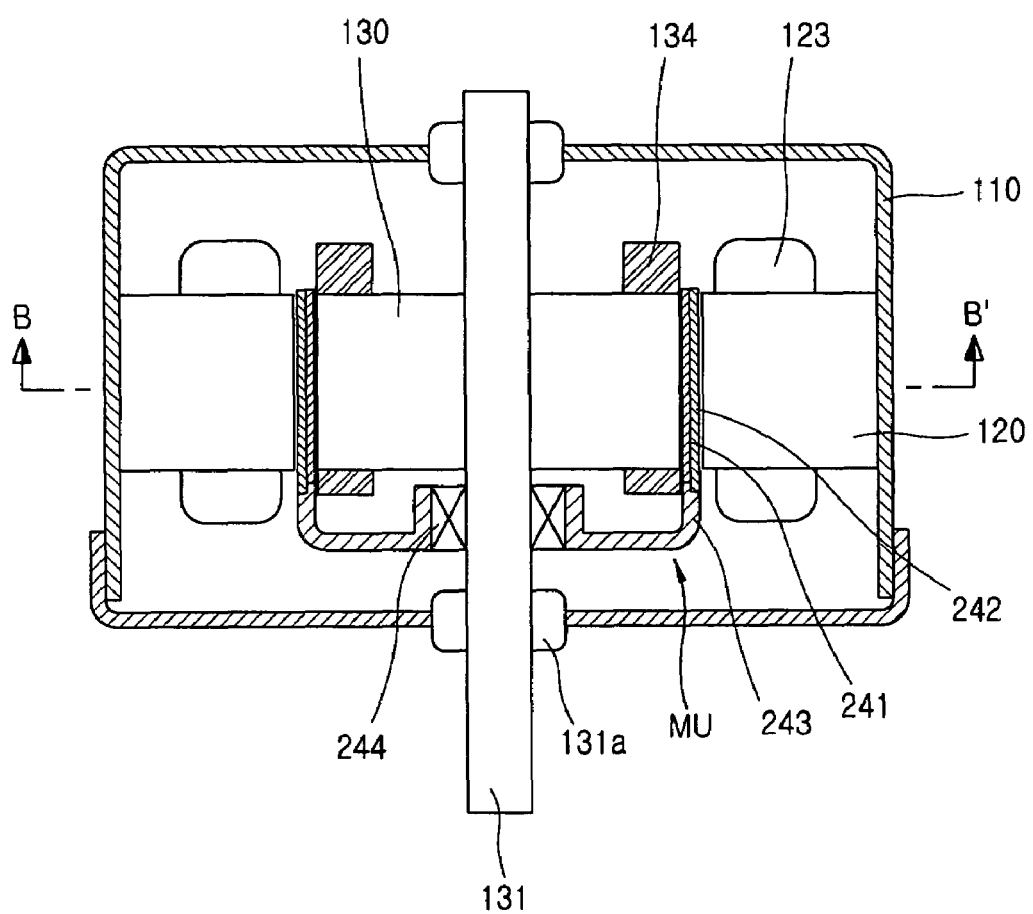
FIG. 6 is a longitudinal section view showing another embodiment of the magnet unit of the single phase induction motor according to the present invention.
Figure 7:
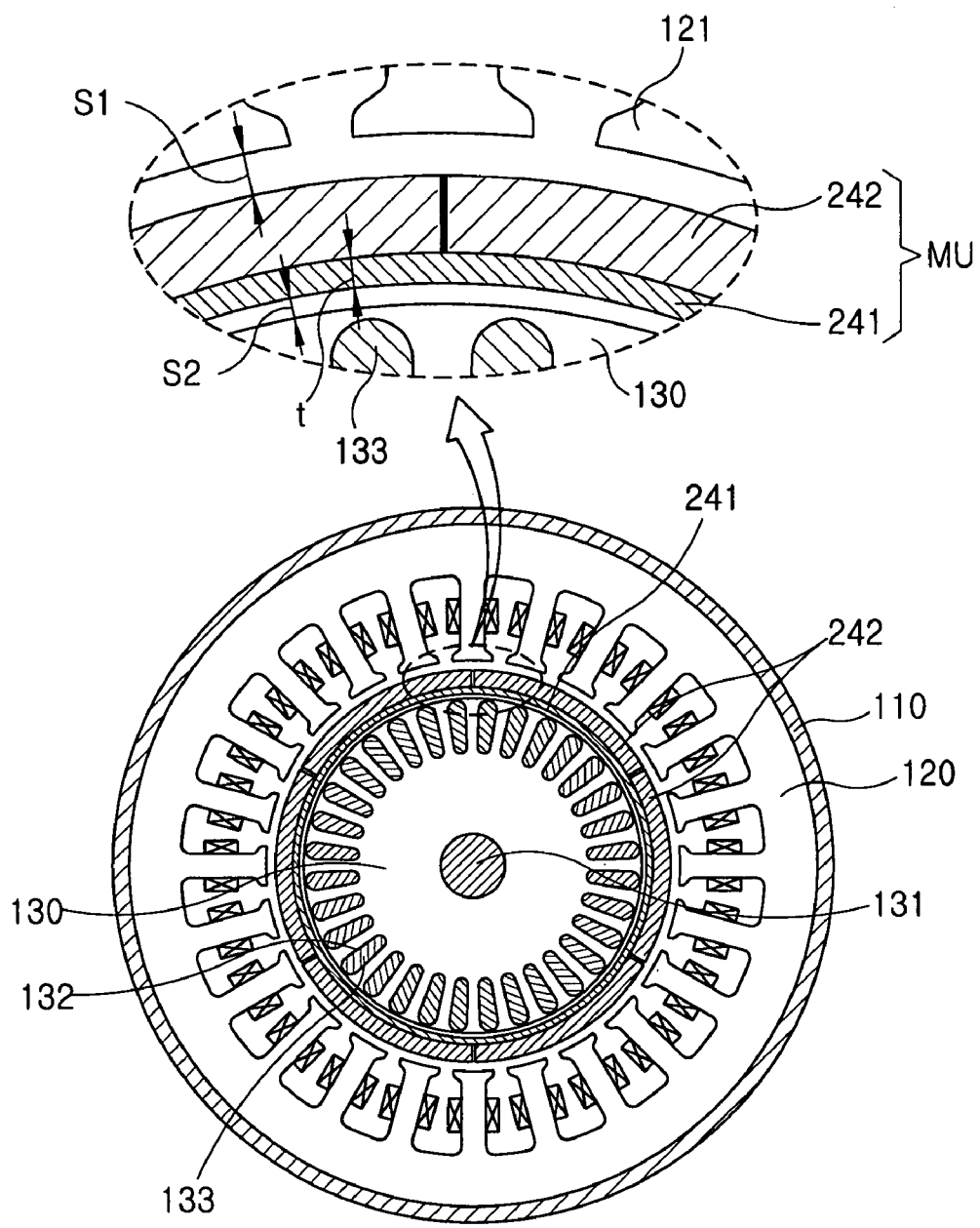
FIG. 7 is a sectional view taken along line B-B' of FIG. 6.
Figure 8:
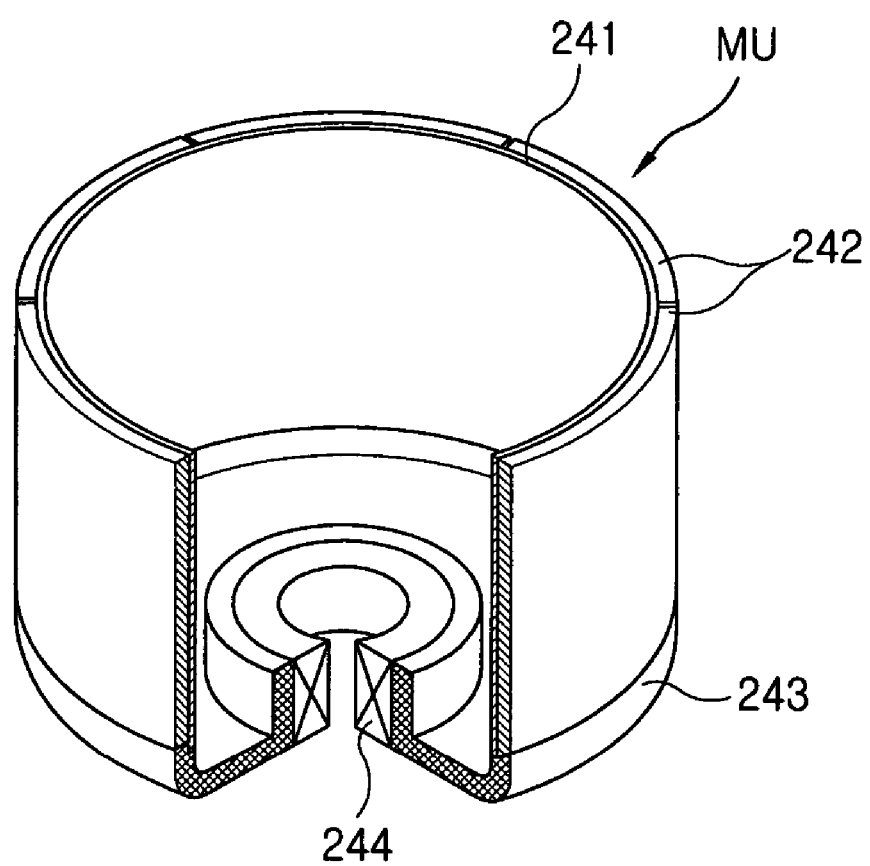
FIG. 8 is a partially-cut perspective view showing the magnet unit of FIG. 6.

FIG. 6 is a longitudinal section view showing another embodiment of the magnet unit of the single phase induction motor according to the present invention, FIG. 7 is a sectional view taken along line B-B' of FIG. 6, and FIG. 8 is a partially-cut perspective view showing the magnet unit of FIG. 6.

Constructions of FIGS. 6 to 8 are the same as those of FIG. 3 except the magnet unit MU, thereby omitting the same constructions.

Referring to FIGS. 6 to 8, the magnet unit MU will be explained. First, a back yoke 241 is located between the stator 120 and the rotor 130, and a plurality of magnets 242 are attached to an outer circumferential surface of the back yoke 241.

The magnets 242 have a certain curvature and are fixed to the outer circumferential surface of the back yoke 241 at a constant interval. Both adjacent ends of each magnet 242 are bonded.

A first gap S1 is between the stator and the magnet 242, and a second gap S2 is between the rotor and the back yoke 241.

It is preferable to set the first gap S1 as approximately 0.8 m/m, the second gap S2 as 0.4 m/m, and the back yoke 241 as 0.4 m/m.

A supporter 243 of a cup shape is coupled to the back yoke 241 so as to support the back yoke 241. The supporter 243 can be integrally injection-molded at one end of the back yoke 241, or although not shown, can be integrally injection-molded at both ends of the back yoke 241.

A bearing 244 is press-fit into a center of the supporter 243 so as to be rotatably coupled to the outer circumferential surface of the rotation shaft 131. The back yoke 241 can be a magnetic substance or a non-magnetic substance.

Figure 9:
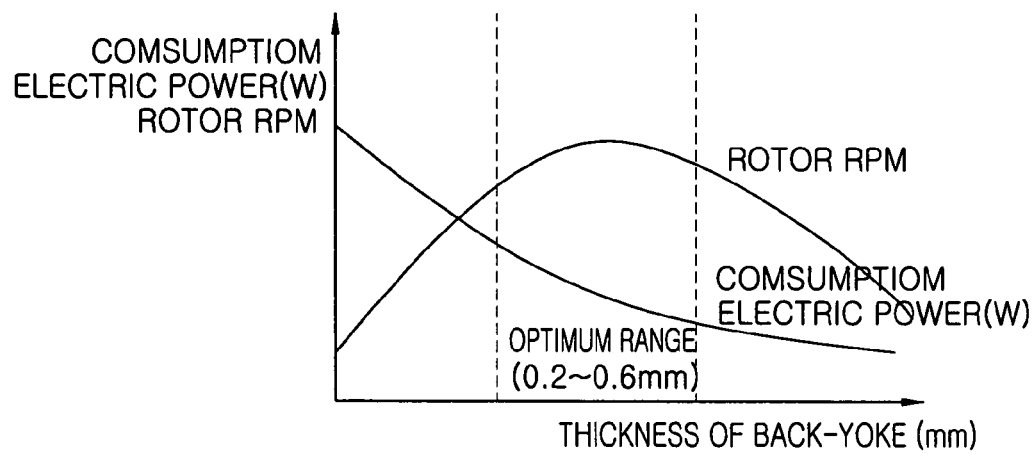
FIG. 9 is a graph showing a relation between a consumption electric power and a rotor rpm according to a thickness of a back yoke of the magnet unit of FIG. 6.

FIG. 9 is a graph showing a relation between a consumption electric power and a rotor rpm according to a thickness of a back yoke of the magnet unit.

In FIG. 9, a horizontal axis represents a thickness of the back yoke, and a vertical axis represents a consumption electric power and a rotor rpm.

A consumption electric power of a motor and a rotor rpm are inversely proportional to each other, so that an optimum induction motor can be designed when the consumption electric power is low and the rotor rpm is high.

In the graph of FIG. 9, when a thickness of the back yoke is 0.2 mm or less than, the consumption electric power of the motor is increased and the rotor rpm is drastically decreased.

Also, when a thickness of the back yoke is 0.6 mm or more than, a magnetic flux of the magnet leaks from the back yoke excessively. According to this, a magnetic flux interlinking with the rotor is drastically decreased and only a magnetic flux interlinking with the stator is increased, thus a consumption electric power is decreased but an output rpm of the rotor directly connected to a load is drastically decreased.

Therefore, when a thickness (t) of the back yoke is 0.2~0.6 mm, an optimum induction motor can be designed.

Hereinafter, still another embodiment of the magnet unit will be explained with reference to FIGS. 10 to 12.

Figure 10:
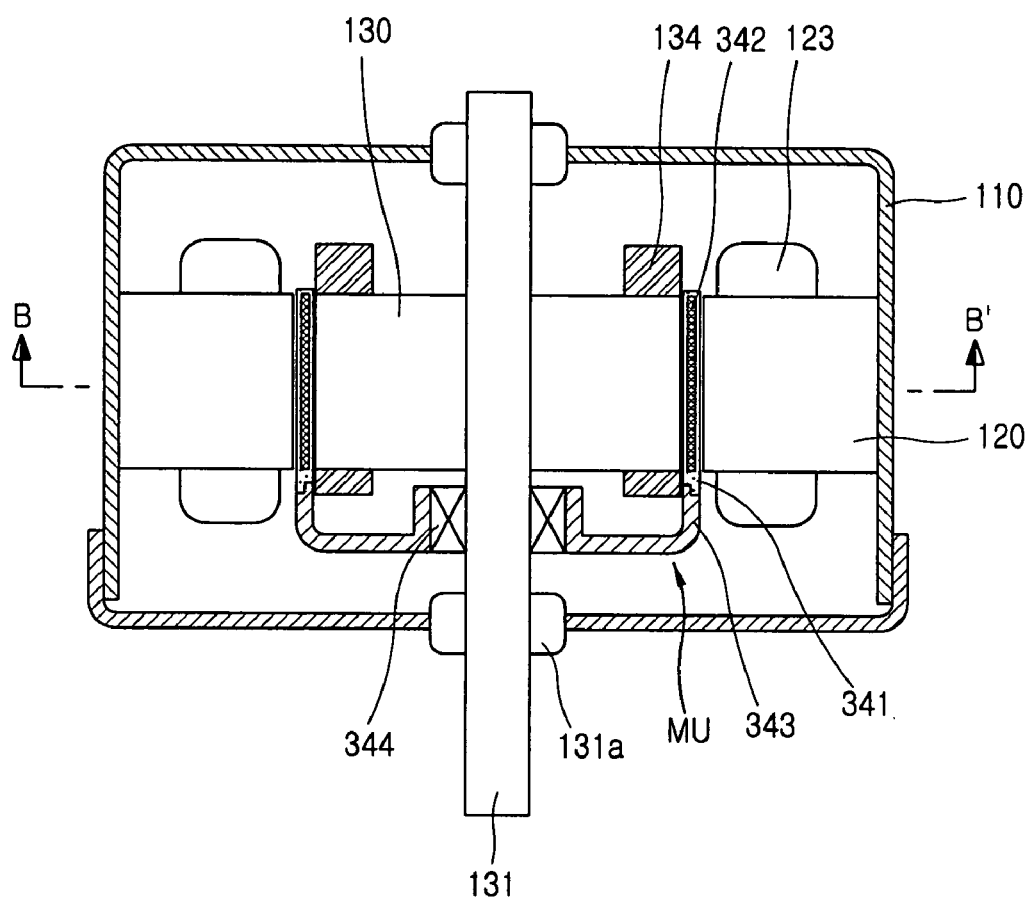
FIG. 10 is a longitudinal section view showing still another embodiment of the magnet unit of the single phase induction motor according to the present invention.
Figure 11:
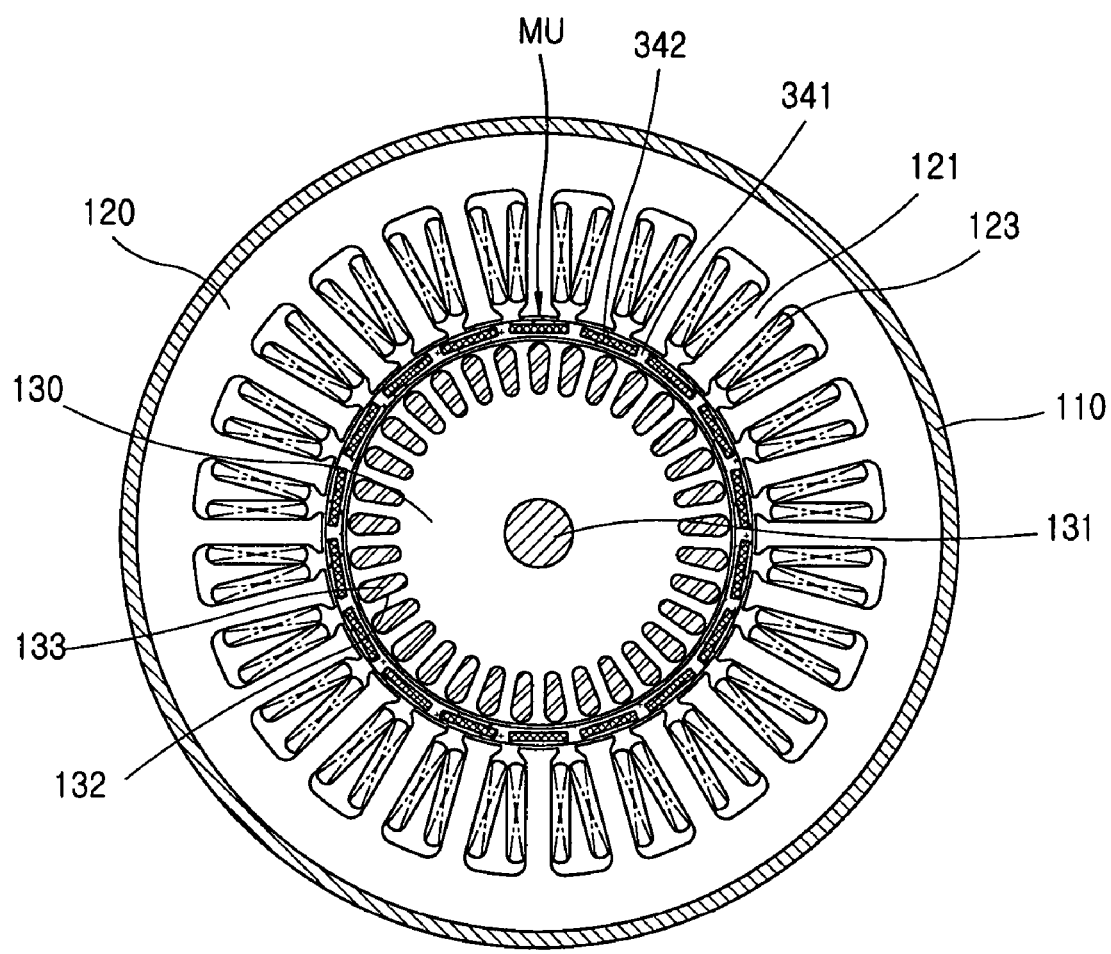
FIG. 11 is a sectional view taken along line B-B' of FIG. 10.
Figure 12:
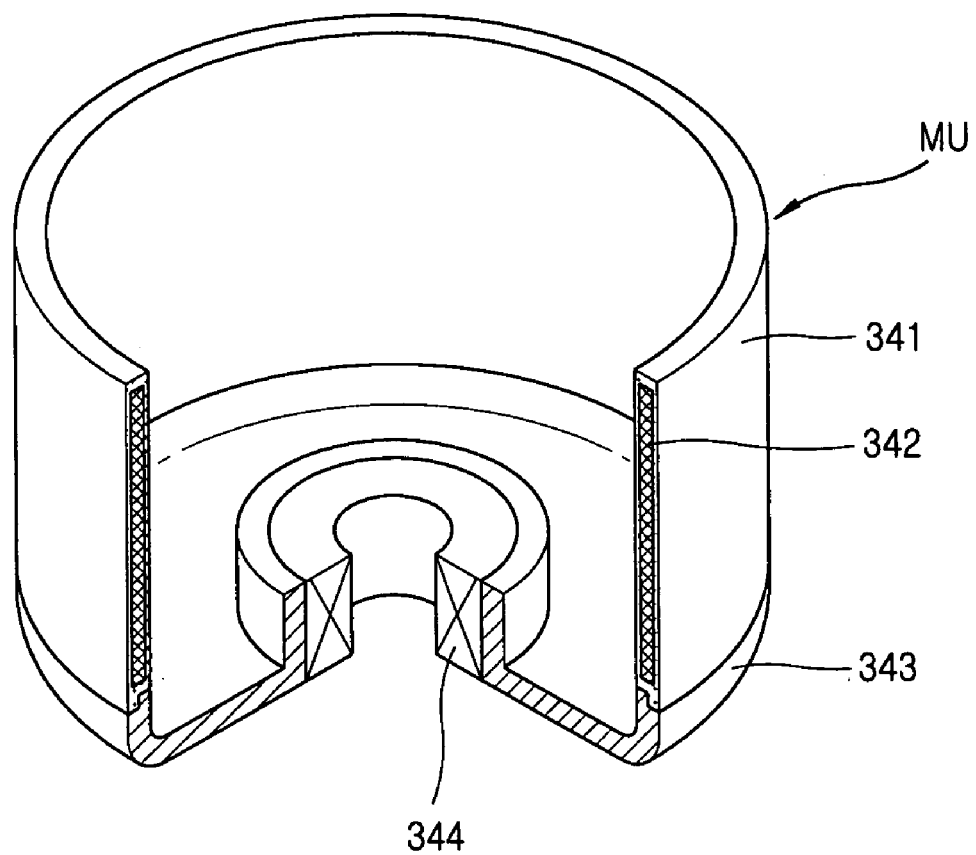
FIG. 12 is a partially-cut perspective view showing the magnet unit of FIG. 10.

FIG. 10 is a longitudinal section view showing still another embodiment of the magnet unit of the single phase induction motor according to the present invention, FIG. 11 is a sectional view taken along line B-B' of FIG. 10, and FIG. 12 is a partially-cut perspective view showing the magnet unit of FIG. 10.

Constructions of FIGS. 10 to 12 are the same as those of FIG. 3 except the magnet unit MU, thereby omitting the same constructions.

Referring to FIGS. 10 to 12, the magnet unit MU will be explained. First, a molding 341 is installed between the stator 120 and the rotor 130, and a magnet 342 is mounted in the molding 341.

The molding 341 formed of resin is provided with a space therein, and the magnet 342 is mounted in the space.

A supporter 343 of a cup shape is coupled to one end of the molding 341 so as to support the molding 341, and a bearing 344 is press-fit into a center of the supporter 343 so as to be rotatably coupled to the outer circumferential surface of the rotation shaft 131.

The molding 341 is a non-magnetic substance, and the supporter 343 can be integrally injection-molded at one side of the molding 341, or although not shown, can be integrally injection-molded at both sides of the molding 341.

The magnet 342 is constituted by a plurality of plates having a certain curvature. The magnet can be arranged in the molding 341 towards a circumference direction, or can be arranged in the molding 341 with a cylindrical shape.

Hereinafter, operations of the single phase induction motor according to the present invention will be explained with reference to FIGS. 3 to 5.

First, if a power is applied to the coil 123, the magnet unit MU is rotated by an alternating current of the coil 123.

Herein, the supporter 142 is constructed to freely rotate around the rotation shaft 131 by the bearing of the supporter 142. Also, since the ring magnet 141 is coupled to the supporter 142, the entire magnet unit MU is rotated.

When the magnet unit MU is rotated, a rotating magnetic field of a strong magnetic flux is generated, thereby rotating the rotor 130.

That is, the magnet unit MU of a low inertia state is rotated by the rotating magnetic field of the stator 120 and synchronized, and at the same time, the magnet unit MU generates a rotating magnetic field and supplies a magnetic flux for generating a torque to the stator 130. According to this, the stator 130 is rotated thus to increase the rotor rpm with a low consumption electric power and to drive the motor with a reduced noise.

Effects of the single phase induction motor according to the present invention will be explained.

First, the magnet unit freely rotated is installed between the stator and the rotor, the magnet unit of a low inertia state is freely rotated by the rotating magnetic field generated from the stator, and the magnet unit again generates the rotating magnetic field of a strong magnetic flux thus to rotate the rotor, thereby enhancing an efficiency of the motor and enabling a low noise driving.

Second, the ring magnet which is a permanent magnet is integrally injection-molded with the supporter, so that the entire structure of the magnet unit is simple thus to obtain great effects such as a high efficiency and a low noise driving with a low cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A single phase induction motor, comprising:
a stator installed in an inner circumferential surface of a motor body, a plurality of coils being wound on the stator;
a rotor rotatably installed in a center portion of the stator and provided with a rotation shaft at a center thereof; and
a magnet unit freely and rotatably installed between the stator and the rotor, the magnet unit being separated from the stator by a first air gap and from the rotor by a second air gap, wherein the magnet unit comprises a back yoke and a plurality of magnets attached to an outer circumferential surface of the back yoke, said plurality of magnets substantially surrounding the entire outer circumferential surface of the back yoke; and
a generally cup-shaped supporter having an open end and a closed end, wherein the open end of the supporter is integrally injection-molded to an axially-facing end of the magnet unit.

2. The single phase induction motor of claim 1, wherein the magnet unit comprises:
a supporter coupled to one end of the back yoke so as to support the back yoke; and
a bearing press-fit into a center of the supporter so as to be rotatably coupled to an outer circumferential surface of the rotation shaft.

3. The single phase induction motor of claim 2, wherein the back yoke is a magnetic substance.

4. The single phase induction motor of claim 2, wherein the back yoke is a non-magnetic substance.

5. The single phase induction motor of claim 2, wherein the supporter is integrally injection-molded at one side of the back yoke.

6. The single phase induction motor of claim 2, wherein the supporter is integrally injection-molded at both sides of the back yoke.

7. The single phase induction motor of claim 2, wherein a thickness of the back yoke is 0.2~0.6 mm.

8. A single phase induction motor, comprising:
a stator installed in an inner circumferential surface of a motor body, a plurality of coils being wound on the stator;
a rotor rotatably installed in a center portion of the stator and provided with a rotation shaft at a center thereof; and
a magnet unit freely and rotatably installed between the stator and the rotor, the magnet unit being separated from the stator by a first air gap and from the rotor by a second air gap, wherein the magnet unit comprises a molding formed or resin and provided with a plurality of pockets therein, and a plurality of magnets respectively mounted in the corresponding plurality of pockets such that the molding covers over an entire area of each magnet in both axial and circumferential directions of the molding; and
a generally cup-shaped supporter having an open end and a closed end, wherein the open end of the supporter is integrally injection-molded to an axially-facing end of the magnet unit.

9. The single phase induction motor of claim 8, wherein the magnet unit comprises:
a supporter coupled to one end of the molding so as to support the molding; and
a bearing press-fit into a center of the supporter so as to be rotatably coupled to an outer circumferential surface of the rotation shaft.

10. The single phase induction motor of claim 9, wherein the molding is a non-magnetic substance.

11. The single phase induction motor of claim 9, wherein the supporter is integrally injection-molded at one side of the molding.

12. The single phase induction motor of claim 9, wherein the supporter is integrally injection-molded at both sides of the molding.

13. The single phase induction motor of claim 9, wherein each of the plurality of magnets has a predetermined curvature and is arranged in the molding in a circumferential direction.

14. The single phase induction motor of claim 9, wherein the plurality of magnets form a cylindrical shape arranged in the molding.

15. A single phase induction motor, comprising:
a stator installed in an inner circumferential surface of a motor body, a plurality of coils being wound on the stator;
a rotor rotatably installed in a center portion of the stator and provided with a rotation shaft at a center thereof; and
a magnet unit freely and rotatably installed between the stator and the rotor, the magnet unit being separated from the stator by a first air gap and from the rotor by a second air gap, wherein the magnet unit comprises a ring magnet,
wherein the magnet is coupled to a generally cup-shaped supporter having an open end and a closed end, and wherein the supporter is integrally injection-molded to an axially-facing end of the ring magnet unit.

16. The single phase induction motor of claim 15, the magnet unit further comprises:
a supporter coupled to one end of the ring magnet for supporting the ring magnet; and
a bearing press-fit into a center of the supporter so as to be rotatably coupled to an outer circumferential surface of the rotation shaft.

17. The single phase induction motor of claim 15, wherein the supporter is a non-magnetic substance.

18. The single phase induction motor of claim 15, wherein the supporter is integrally injection-molded at both sides of the ring magnet.

19. The single phase induction motor of claim 15, wherein the supporter is formed of the same material as the ring magnet.

20. The single phase induction motor of claim 15, wherein the bearing is a ball bearing type.

21. The single phase induction motor of claim 15, wherein the bearing is an oilless bearing type.

22. The single phase induction motor of claim 15, wherein the ring magnet comprises a single magnetic element having a cylindrical shape.

* * * * *